(12) United States Patent
Aldalaan et al.

(10) Patent No.: US 10,882,742 B2
(45) Date of Patent: Jan. 5, 2021

(54) PROCESS FOR SEPARATION OF HYDROGEN AND OXYGEN

(71) Applicant: SABIC Global Technologies B.V., Bergen op Zoom (NL)

(72) Inventors: Nasser Ali Aldalaan, Riyadh (SA); Abdulaziz M. Al-Jodai, Riyadh (SA); Mubarik Ali Bashir, Riyadh (SA)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 218 days.

(21) Appl. No.: 16/073,109

(22) PCT Filed: Jan. 6, 2017

(86) PCT No.: PCT/IB2017/050063
§ 371 (c)(1),
(2) Date: Jul. 26, 2018

(87) PCT Pub. No.: WO2017/134534
PCT Pub. Date: Aug. 10, 2017

(65) Prior Publication Data
US 2019/0031504 A1    Jan. 31, 2019

Related U.S. Application Data

(60) Provisional application No. 62/290,131, filed on Feb. 2, 2016.

(51) Int. Cl.
*B01D 53/047* (2006.01)
*C01B 3/00* (2006.01)
(Continued)

(52) U.S. Cl.
CPC ............ *C01B 3/042* (2013.01); *B01D 53/047* (2013.01); *C01B 3/56* (2013.01); *C01B 13/0207* (2013.01);
(Continued)

(58) Field of Classification Search
CPC ................ B01D 53/04; B01D 53/047; B01D 2253/102; B01D 2253/108;
(Continued)

(56) References Cited

U.S. PATENT DOCUMENTS 3,788,037 A    1/1974   Shell et al.
4,476,105 A    10/1984  Greenbaum
(Continued)

FOREIGN PATENT DOCUMENTS

DE    3010781      10/1981
JP    2003327401   11/2003
(Continued)

OTHER PUBLICATIONS

Belloni, "Adsorption: A Successful Versatile Separation Technique Continuously Improved at Linde," Chemie Ingenieur Technik, 83(1-2), 29-35, 2011.
(Continued)

*Primary Examiner* — Frank M Lawrence, Jr.
(74) *Attorney, Agent, or Firm* — Norton Rose Fulbright US LLP

(57) ABSTRACT

Embodiments of the invention are directed to methods, processes, and systems for safely and reliably purifying hydrogen from a gas mixture containing hydrogen and oxygen.

15 Claims, 1 Drawing Sheet

(51) Int. Cl.
*C01B 3/04* (2006.01)
*C01B 3/56* (2006.01)
*C01B 13/02* (2006.01)

(52) U.S. Cl.
CPC ...... *C01B 13/0259* (2013.01); *C01B 13/0281* (2013.01); *B01D 2253/102* (2013.01); *B01D 2253/108* (2013.01); *B01D 2253/116* (2013.01); *B01D 2253/308* (2013.01); *B01D 2256/12* (2013.01); *B01D 2256/16* (2013.01); *B01D 2257/104* (2013.01); *B01D 2257/108* (2013.01); *B01D 2259/40001* (2013.01); *B01D 2259/40013* (2013.01); *C01B 3/0005* (2013.01); *C01B 2203/042* (2013.01); *C01B 2203/043* (2013.01); *Y02E 60/36* (2013.01)

(58) Field of Classification Search
CPC ........ B01D 2253/116; B01D 2253/308; B01D 2256/12; B01D 2256/16; B01D 2257/104; B01D 2257/108; B01D 2259/40001; B01D 2259/40013; Y02E 60/364; C01B 3/0005; C01B 3/042; C01B 3/56; C01B 13/0207; C01B 13/0259; C01B 13/0281; C01B 2203/042; C01B 2203/043
USPC ....... 95/96, 138; 96/108, 121, 134; 423/644, 423/648.1
See application file for complete search history.

(56) References Cited

U.S. PATENT DOCUMENTS

| | | | |
|---|---|---|---|
| 5,093,302 | A | 3/1992 | Sasao et al. |
| 5,397,559 | A | 3/1995 | Kogan |
| 6,660,064 | B2 | 12/2003 | Golden et al. |
| 8,657,920 | B2 | 2/2014 | Nakanishi et al. |
| 2004/0107831 | A1 | 6/2004 | Graham |
| 2008/0216652 | A1* | 9/2008 | Keller ............ C01B 3/58 95/96 |
| 2008/0311015 | A1 | 12/2008 | Hofmann et al. |
| 2009/0321244 | A1* | 12/2009 | Smith ............ B01J 23/72 204/157.52 |
| 2013/0248349 | A1 | 9/2013 | Mul |
| 2013/0252121 | A1 | 9/2013 | Oppenheim |
| 2015/0010463 | A1* | 1/2015 | Bao ............ B01J 35/0013 423/594.19 |

FOREIGN PATENT DOCUMENTS

| | | |
|---|---|---|
| SU | 1623737 | 1/1991 |
| WO | WO 1997010172 | 3/1997 |
| WO | WO 2010079726 | 7/2010 |

OTHER PUBLICATIONS

International Search Report and Written Opinion Issued in Corresponding PCT Application No. PCT/IB2017/050063, dated Apr. 3, 2017.

* cited by examiner

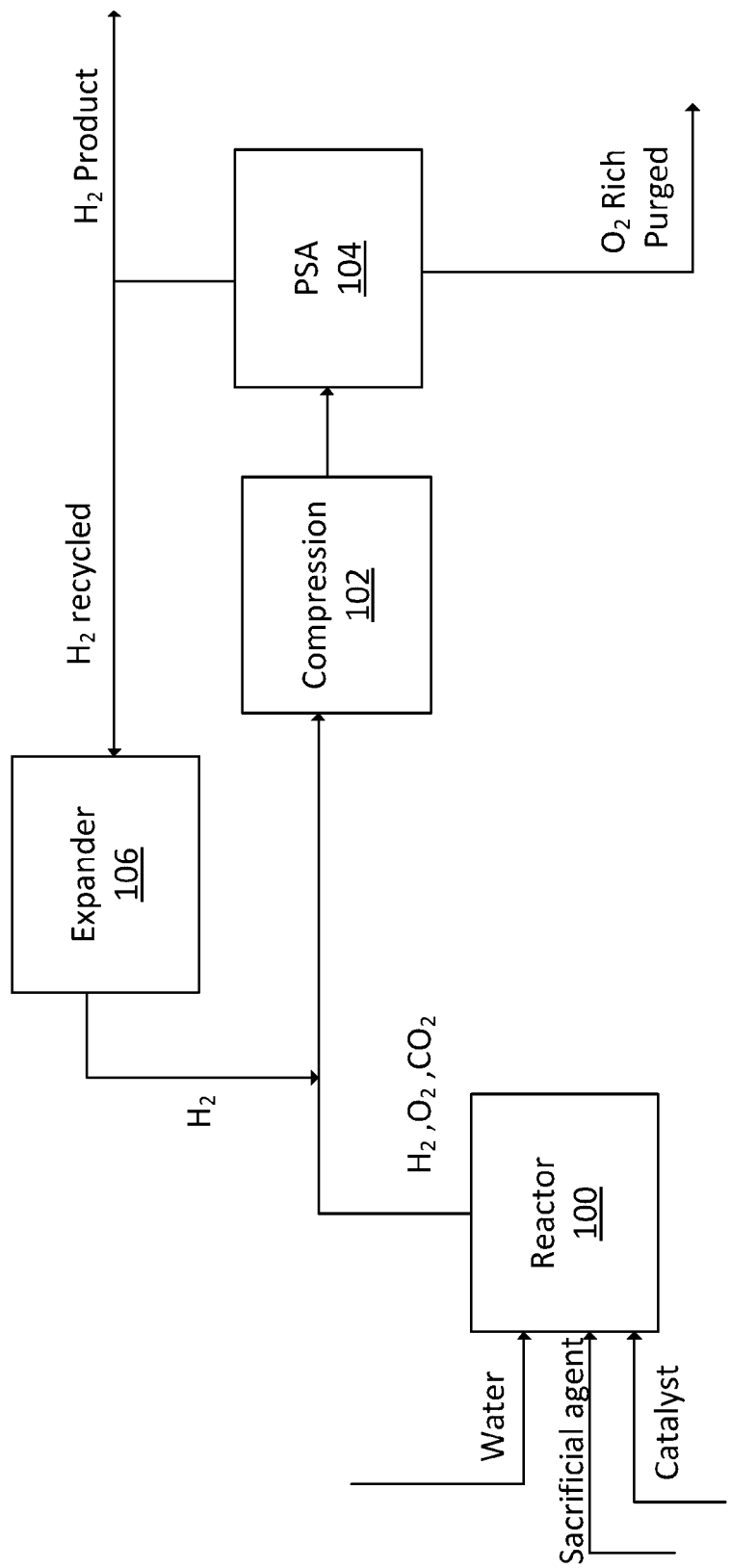

PROCESS FOR SEPARATION OF HYDROGEN AND OXYGEN

CROSS-REFERENCE TO RELATED APPLICATIONS

This application is a national phase application under 35 U.S.C. § 371 of International Application No. PCT/IB2017/050063 filed Jan. 6, 2017, which claims the benefit of priority of U.S. Provisional Patent Application No. 62/290,131, filed Feb. 2, 2016. The entire contents of each of the above-referenced disclosures are specifically incorporated herein by reference.

BACKGROUND

Hydrogen fuel production has gained increased attention as oil and other nonrenewable fuels become increasingly depleted and expensive. Methods such as photocatalytic water splitting are being investigated to produce hydrogen fuel, which burns cleanly and can be used in a hydrogen fuel cell. Water splitting holds particular interest since it utilizes water, an inexpensive renewable resource, as a feedstock for photocatalytic splitting of water molecules into hydrogen and oxygen using light.

Currently there is a lack of commercial methods or technologies for purifying hydrogen gas produced via this process. The process produces a highly explosive gas mixture, which requires using as yet defined techniques and/or system(s) to separate and purify hydrogen from oxygen. The currently known methods for separating the gas mixture produced by water lack reliability and safety, and are considered unrealistic from engineering point of view.

Thus, there remains a need for additional methods, processes, and systems for purifying hydrogen from a gas mixture containing hydrogen and oxygen.

SUMMARY

Embodiments of the current disclosure relate to methods, processes, and systems for safely and reliably separating hydrogen from a gas mixture containing hydrogen and oxygen, such as a gas mixture produced by a photocatalytic water splitting process. The solution reduces the explosivity/flammability of the feed source produced by a photocatalytic water-splitting reaction by injecting hydrogen gas and separates hydrogen from the feed source using pressure swing adsorption (PSA).

Certain embodiments are directed to a process for producing hydrogen from water that includes one or more of the following steps: (a) contacting a water source with a water splitting photocatalyst, and exposing the water and photocatalyst to light under conditions that splits water into hydrogen and oxygen forming a feed gas for separation; (b) separating hydrogen from the feed gas by (i) mixing the feed gas with a hydrogen stream, reducing the combustibility of the feed gas and forming a feed source; (ii) compressing the feed source to a pressure of at least 10, 20, 30, 40 or 50 bars forming a compressed feed source; (iii) exposing the compressed feed source to an adsorption medium that differentially adsorbs oxygen producing an enriched hydrogen product gas and an adsorbed oxygen source; (iv) separating the enriched hydrogen product gas and the adsorbed oxygen source; and (v) desorbing the adsorbed oxygen from the adsorbed oxygen source by reducing the pressure on the adsorption medium where the oxygen is desorbed forming an enriched oxygen product gas; (c) collecting, storing, and/or utilizing the hydrogen product gas and the oxygen product gas. In certain aspects the process is performed at about 5, 10, 15, 20, or 25 to 20, 25, 30, 35, or 40° C. In a further aspect the process is performed at about 20° C. The hydrogen stream can be a recycled portion of the enriched hydrogen stream (hydrogen product gas). In certain aspects the hydrogen in the feed gas is elevated above 75% hydrogen by volume or the oxygen content is reduced to below 1% oxygen by volume. In certain aspects the feed source is compressed to at least or about 10, 20, 30, 40, 50, or 60 bars. In a further aspect the feed source is compressed to a pressure of at least 10 bars. In certain aspects the feed source is compressed using a centrifugal compressor. The process can further include filtering and dehydrating the feed source or the compressed feed source prior to separating hydrogen from the feed source.

The adsorption medium preferentially adsorbs components of the feed source (e.g., oxygen and other non-hydrogen molecules), while allowing hydrogen to pass. The adsorption medium can comprises molecular sieve material(s) that preferentially adsorbs oxygen and other non-hydrogen gases or impurities at an elevated pressure, allowing hydrogen to pass. Molecular sieves can be defined as substances with discrete pore structures that can discriminate between molecules on the basis of size and/or adsorption characteristics. The molecular sieve can be a carbon molecular sieve (CMS) or a zeolite. CMS is a special class of amorphous activated carbon. One feature of CMSs is that they provide molecular separations based on rate of adsorption rather than on the differences in adsorption capacity. Zeolites are aluminosilicate minerals with complex crystal structures made up of interlocking rings of silicon, aluminum and oxygen ions. In certain aspects the adsorption medium comprises both a CMS and a zeolite. In certain aspects the CMS is a 6-16 mesh. In certain aspects the zeolite is a 5 A zeolite of 4-8 mesh. Once the adsorption medium is saturated it can be regenerated by reducing the pressure and allowing the adsorbate to desorb, thus regenerating the adsorption medium. The cyclic pressurization and depressurization is referred to as pressure swing adsorption.

In certain aspects the feed source can comprise about or at least 50, 60, 70, or 80 mol % hydrogen. In a further aspect the feed source comprises about 70 mol % hydrogen. The separated hydrogen stream or hydrogen product can comprise about or at least 90, 92, 94, 96, 98, up to 99.5 mol % hydrogen. In certain aspects the hydrogen product is about or at least 95 or 98 mol % hydrogen. In certain aspects the process or certain steps in the process is performed under conditions and using equipment to minimize spark generation during compression and transfer of gas source or products.

Certain embodiment are directed to a hydrogen stream produced by the process described above and having at least 95, 98, 99, to 99.5 mol % hydrogen.

Certain embodiment are directed to an oxygen offgas produced by the process described above and having at least 40, 50, 60, to 70 mol % oxygen.

Further embodiments are directed to a hydrogen purification system that includes: (a) a photocatalytic reactor configured to operate at approximately atmospheric pressure for splitting water into hydrogen and oxygen; (b) a hydrogen injector configured to mix hydrogen with the feed source producing a hydrogen diluted feed source, reducing the combustibility of the feed source; (c) a compressor configured to receive a hydrogen diluted feed source from the photocatalyic reactor, the compressor being configured to compress the hydrogen diluted feed source to at least 10, 20, 30, 40, or 50 bar; (d) a pressure swing absorption (PSA) separation unit comprising an adsorption medium that selectively adsorbs oxygen, the PSA unit configured to (i) receive a pressurized hydrogen diluted feed source from the compressor and (ii) produce an enriched hydrogen stream. The system can further include one or more of (i) an expander unit configured to receive at least a portion of the enriched hydrogen stream and produce energy to drive the compressor, (ii) a hydrogen storage device to collect and store at least a portion of the enriched hydrogen stream, and/or (iii) an oxygen storage device to collect and store at least a portion of the enriched oxygen stream.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment or aspect discussed herein can be implemented with respect to any method or composition of the invention, and vice versa.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 1. A block diagram of one embodiment of a hydrogen purification system disclosed herein.

DESCRIPTION

Embodiments of the current disclosure relate to methods, processes, and systems for safely and reliably purifying hydrogen from a gas mixture containing hydrogen and oxygen, such as that produced by the photocatalytic water splitting process. The solution separates a highly flammable and explosive gas containing hydrogen and oxygen to at least a product gas comprising at least 95 mol % hydrogen.

I. Photocatalytic Water Splitting

Photocatalytic water splitting is the light-induced conversion reaction of water to hydrogen and oxygen. This reaction has attracted attention as one of the most promising hydrogen production processes. Photocatalytic water splitting is an artificial process for the dissociation of water into its constituent parts, hydrogen ($H_2$) and oxygen ($O_2$), using either artificial or natural light without producing greenhouse gases or having many adverse effects on the atmosphere. When $H_2O$ is split into $O_2$ and $H_2$, the stoichiometric ratio of its products is 2:1.

There are several requirements for a photocatalyst to be useful for water splitting. The minimum potential difference (voltage) needed to split water is 1.23V at 0 pH. Since the minimum band gap for successful water splitting at pH=0 is 1.23 eV the electrochemical requirements can theoretically reach down into infrared light, albeit with negligible catalytic activity. These values are true only for a completely reversible reaction at standard temperature and pressure (1 bar and 25° C.). Theoretically, infrared light has enough energy to split water into hydrogen and oxygen; however, this reaction is kinetically very slow because the wavelength is greater than 380 nm. The potential must be less than 3.0V to make efficient use of the energy present across the full spectrum of sunlight. Water splitting can transfer charges, but not be able to avoid corrosion for long term stability. Defects within crystalline photocatalysts can act as recombination sites, ultimately lowering efficiency.

Materials used in photocatalytic water splitting fulfill the band requirements and typically have dopants and/or co-catalysts added to optimize their performance. A sample semiconductor with the proper band structure is titanium dioxide ($TiO_2$). However, due to the relatively positive conduction band of $TiO_2$, there is little driving force for $H_2$ production, so $TiO_2$ is typically used with a co-catalyst such as platinum (Pt) to increase the rate of $H_2$ production. It is routine to add co-catalysts to spur $H_2$ evolution in most photocatalysts due to the conduction band placement. Most semiconductors with suitable band structures to split water absorb mostly UV light; in order to absorb visible light, it is necessary to narrow the band gap.

Photocatalysts can suffer from catalyst decay and recombination under operating conditions. In certain aspects catalyst decay becomes a problem when using a sulfide-based photocatalyst such as cadmium sulfide (CdS), as the sulfide in the catalyst is oxidized to elemental sulfur at the same potentials used to split water. Thus, sulfide-based photocatalysts are not viable without sacrificial reagents such as sodium sulfide to replenish any sulfur lost, which effectively changes the main reaction to one of hydrogen evolution as opposed to water splitting. Recombination of the electron-hole pairs needed for photocatalysis can occur with any catalyst and is dependent on the defects and surface area of the catalyst; thus, a high degree of crystallinity is required to avoid recombination at the defects.

Examples of photocatalyst include, but are not limited to $NaTaO_3$:La, $K_3Ta_3B_2O_{12}$, $(Ga_{0.82}Zn_{0.18})(N_{0.82}O_{0.18})$, $Pt/TiO_2$, and Cobalt based systems.

$NaTaO_3$:La—$NaTaO_3$:La yields a high water splitting rate of photocatalysts without using sacrificial reagents. The nanostep structure of the material promotes water splitting as edges functioned as $H_2$ production sites and the grooves functioned as $O_2$ production sites. Addition of NiO particles as co-catalysts assisted in $H_2$ production; this step can be done by using an impregnation method with an aqueous solution of $Ni(NO_3)\cdot 6H_2O$ and evaporating the solution in the presence of the photocatalyst.

$K_3Ta_3B_2O_{12}$—$K_3Ta_3B_2O_{12}$ is activated by UV light and above, does not have the performance or quantum yield of $NaTaO_3$:La. However, it does have the ability to split water without the assistance of co-catalysts. This ability is due to the pillared structure of the photocatalyst, which involves $TaO_6$ pillars connected by $BO_3$ triangle units.

$(Ga_{0.82}Zn_{0.18})(N_{0.82}O_{0.18})$—$(Ga_{0.82}Zn_{0.18})(N_{0.82}O_{0.18})$ has a high quantum yield in visible light for visible light-based photocatalysts that do not utilize sacrificial reagents. Tuning the catalyst is done by increasing calcination temperatures for the final step in synthesizing the catalyst. Temperatures up to 600° C. helped to reduce the number of defects, though temperatures above 700° C. can destroy the local structure around zinc atoms.

$Pt/TiO_2$—$TiO_2$ is a very efficient photocatalyst, as it yields both a high quantum number and a high rate of $H_2$ gas evolution, e.g., $Pt/TiO_2$ (anatase phase). These photocatalysts combine with a thin NaOH aqueous layer to make a solution that can split water into $H_2$ and $O_2$. $TiO_2$ absorbs only ultraviolet light due to its large band gap (>3.0 ev), but outperforms most visible light photocatalysts because it does not photocorrode as easily. Most ceramic materials have large band gaps and thus have stronger covalent bonds than other semiconductors with lower band gaps.

Cobalt based systems—Photocatalysts based on cobalt have been reported. Members are tris(bipyridine) cobalt(II), compounds of cobalt ligated to certain cyclic polyamines, and certain cobaloximes. Chromophores have reportedly been connected to part of a larger organic ring that surrounded a cobalt atom. The process is less efficient than using a platinum catalyst, but cobalt is less expensive, potentially reducing total costs. The process uses one of two supramolecular assemblies based on Co(II)-templated coordination as photosensitizers and electron donors to a cobaloxime macrocycle.

II. Hydrogen Purification

The gas produced from the photocatalytic water-splitting process is at near atmospheric pressure and it can contain about 70% mol $H_2$, 25% mol $O_2$ and 5% mol $CO_2$. The source gas is injected with hydrogen, reducing the flammability of the feed source, and compressed to increase the pressure of the source gas to the desired delivery pressure forming the feed source. The compressor, for example, is a centrifugal compressor, a piston compressor, a diaphragm compressor, a scroll compressor, or other type of compressor. In certain aspects the gas is compressed using a centrifugal compressor. In certain aspects the gas is compressed to approximately or at least 10, 20, 30, 40, or 50 bar and sent to an adsorption vessel or unit for gas separation. For safety, the compressor should be a spark-free or spark-suppressed compressor.

Compressed gas is used as a medium in numerous applications. Among various known techniques for compression of gas, centrifugal compressors constitute a specific example of compression devices. Centrifugal compressors achieve a pressure rise by adding kinetic energy/velocity to a continuous flow of fluid through a rotor or impeller. This kinetic energy is then converted to an increase in potential energy/static pressure by slowing the flow through a diffuser. The pressure rise in impeller is in most cases almost equal to the rise in the diffuser section. In certain aspects the compressor has an inlet and an outlet that are controlled by valves.

Various compressor types can be used, such as diaphragm type compressors, which can be obtained through PDC Machines (Warminster, Pa.) or Howden & Sundyne (Arvada, Col.) for example; or an ionic liquid filled compressor, which can be obtained from Linde (Pittston, Pa.) for example; or a labyrinth seal piston compressor, which can be obtained from Burckhardt Compression (Houston, Tex.) for example.

After safely compressing the feed gas and producing the feed source, the feed source is sent to a Pressure swing adsorption (PSA) unit. PSA is a technology used to separate gas species from a mixture of gases under pressure according to the species' molecular characteristics and affinity for an adsorbent material. It operates at near-ambient temperatures and differs significantly from cryogenic distillation techniques of gas separation. Specific adsorptive materials (e.g., zeolites, activated carbon, molecular sieves, etc.) are used as a trap, preferentially adsorbing the target gas species at high pressure. The process then swings to low pressure to desorb the adsorbed material. PSA processes rely on the fact that under high pressure, gases tend to be attracted to solid surfaces, or "adsorbed". The higher the pressure, the more gas is adsorbed; when the pressure is reduced, the gas is released, or desorbed.

Aside from their ability to discriminate between different gases, adsorbents for PSA systems are usually very porous materials chosen because of their large specific surface areas. Typical adsorbents are activated carbon, silica gel, alumina and zeolite. Though the gas adsorbed on these surfaces may consist of a layer only one or at most a few molecules thick, surface areas of several hundred square meters per gram enable the adsorption of a significant portion of the adsorbent's weight in gas. In addition to their selectivity for different gases, zeolites and some types of activated carbon called carbon molecular sieves may utilize their molecular sieve characteristics to exclude some gas molecules from their structure based on the size of the molecules, thereby restricting the ability of the larger molecules to be adsorbed.

The PSA unit comprises an adsorber vessel(s) containing an adsorption material (adsorbent) configured to perform PSA. In certain aspects multiple adsorber vessels (2, 3, 4, or more) can be used to provide a continuous hydrogen supply. The PSA process has four basic process steps: adsorption, depressurization, regeneration, and repressurization.

The adsorbent of the present invention can be incorporated into solid particles in which the adsorbent is present in an amount effective to promote the desired separation. Solid particles comprising the molecular sieve and a binder may be formed into shapes such as pills, pellets, granules, rings, spheres, etc. Generally, a slurry mixture comprising the molecular sieve, binder, and water is prepared and the slurry mixture is blended by sonification, milling, etc. prior to formation of the solid particles by extrusion, spray-drying, etc. In one aspect, the solid particles comprise an adsorptively effective amount of the adsorbent and at least one matrix material, preferably selected from the group consisting of binder materials, filler materials, and mixtures thereof to provide a desired property or properties, e.g., desired adsorbent dilution, mechanical strength, and the like to the solid particles. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, aluminophosphates, mixtures of these, and the like. The preparation of solid particles comprising adsorbent and matrix materials is conventional and well known in the art and, therefore, need not be discussed in detail.

Adsorption is carried out at an elevated pressure, the pressure being determined by the pressure of the feed source. The feed source flows through the adsorber vessel, in certain aspects the flow is in an upward direction. Oxygen and other non-hydrogen components are selectively adsorbed on the surface of the adsorbent material producing a hydrogen product gas. After a defined time, the adsorption phase is terminated and a regeneration phase initiated. In certain aspects another adsorber vessel takes over the task of adsorption to ensure a continuous hydrogen supply.

The regeneration phase includes pressure equalization, provide purge, dump, purging, and repressurization. The steps are combined so as to minimize hydrogen losses and consequently to maximize the hydrogen recovery rate of the PSA system. Pressure equalization can begin by stopping or diverting the feed source. Typically depressurization starts in the co-current direction from bottom to top. In certain aspects the gas stream collected from a depressurization cycle can be compressed or included in a compressed feed source and introduced to a second adsorber vessel, e.g., the hydrogen still in the void space of the adsorption medium can be used to pressurize a second adsorber. A purge gas is can then be provided as the final depressurization step when the remaining pressure is released in counter-current direction with desorbed components leaving the adsorber at the bottom forming an oxygen enriched product. Final desorption and regeneration is performed at the lowest pressure of the sequence.

Before restarting adsorption, the regenerated adsorber must be pressurized again. This is accomplished in the pressure equalization step by using a compressed hydrogen or feed source. In certain aspects repressurization to adsorption pressure can be carried out with a split stream from the hydrogen product line and the feed source. Having reached the required pressure level, the regenerated adsorber can be used to perform adsorption until the next regeneration cycle is needed.

Before a fire or explosion can occur, three conditions must be met simultaneously. A fuel (e.g., hydrogen) and oxygen must exist in certain proportions, along with an ignition source, such as a spark or flame. The ratio of fuel and oxygen that is required varies with each combustible gas or vapor. Hydrogen has a wide flammability range in comparison with other fuels. For example hydrogen has a lower explosivity limit of 4% hydrogen v/v and an upper explosivity limit of 75% hydrogen v/v in air. In one aspect of the process described herein is to decrease the explosivity or flammability by increasing the amount of hydrogen above its explosivity limit or decreasing the amount of oxygen in relation to hydrogen in the feed source to an acceptable level, e.g., less than 1% $O_2$.

FIG. 1 illustrates a flow diagram for one embodiment of the system. FIG. 1 illustrates a scheme where reactants (e.g., water and sacrificial agent) and catalyst are provided in reactor 100 where photocatalytic water splitting is performed. Once the water is split the resulting gas is combined with a high purity hydrogen stream and transferred to a first compressor 102 where is compressed to increase the pressure and form a feed source. The compressed feed source is transferred to a pressure swing adsorption unit (PSA) 104. In PSA 104 the feed source is exposed to an adsorption medium that preferentially adsorbs oxygen and other non-hydrogen molecules forming a hydrogen rich gas product. Oxygen and other gases are retained in or on the adsorption medium forming an oxygen rich adsorption medium. When needed the oxygen rich adsorption medium can be regenerated forming an oxygen rich product gas, which can be recycled or further processed. The permeate is transferred to a second compressor 106 where it is compressed to increasing the pressure. In certain aspects a portion of the hydrogen product can be transferred to expander 106 that produces energy that can be used to drive, at least partially, compressor 102. The non-recycled portion of the hydrogen product is sent on for storage or utilization. The system can include various interconnecting piping, control valves and instrumentation as well as a control system for control of the system and process.

The examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A process for separating hydrogen and oxygen from a gas mixture that is produced from photocatalytic splitting of water comprising:
    (a) contacting a water source with a water splitting photocatalyst, and exposing the water and photocatalyst to light under conditions that splits water into hydrogen and oxygen forming a feed gas for separation;
    (b) separating hydrogen and oxygen from the feed gas by
        (i) mixing the feed gas with a hydrogen stream, reducing the combustibility of the feed source and forming a feed source;
        (ii) compressing the feed source to a pressure of at least 10 bars forming a compressed feed source;
        (iii) exposing the compressed feed source to an adsorption medium that differentially adsorbs oxygen producing an enriched hydrogen product gas and an adsorbed oxygen source;
        (iv) separating the enriched hydrogen stream and the adsorbed oxygen source; and
        (v) desorbing the adsorbed oxygen from the adsorbed oxygen source by reducing the pressure on the adsorption medium forming an oxygen enriched product gas;
    (c) collecting, storing, and/or utilizing a hydrogen product gas and an oxygen product gas.

2. The process of claim 1, wherein the process is performed at 5 to 40° C.

3. The process of claim 1, wherein the process is performed at about 20° C.

4. The process of claim 1, wherein the feed source is mixed with a recycled portion of the enriched hydrogen product gas.

5. The process of claim 1, wherein the feed source is compressed using a centrifugal compressor.

6. The process of claim 1, further comprising filtering and dehydrating the feed source or the compressed feed source prior to separating hydrogen from the feed source.

7. The process of claim 1, wherein the adsorption medium comprises a molecular sieve that preferentially adsorbs oxygen when under pressure.

8. The process of claim 7, wherein the molecular sieve is a carbon molecular sieve that selectively adsorbs oxygen or other non-hydrogen molecules.

9. The process of claim 7, wherein the adsorption medium further comprises zeolites.

10. The process of claim 9, wherein the zeolite is a 5 angstrom zeolite.

11. The process of claim 1, wherein the adsorption medium comprises zeolite molecular sieves and carbon molecular sieves.

12. The process of claim 1, wherein the feed source is compressed to at least 10, 20, 30, 40, 50, or 60 bar.

13. The process of claim 1, wherein the feed source comprises about 70 mol % hydrogen.

14. The process of claim 1, wherein the enriched hydrogen product gas comprises at least 95 mol % hydrogen.

15. The process of claim 1, wherein the process is performed under conditions and using equipment to minimize spark generation.

* * * * *